(12) United States Patent
Han et al.

(10) Patent No.: US 7,218,514 B2
(45) Date of Patent: May 15, 2007

(54) I/O INTERFACE COVER ASSEMBLY OF COMPUTER ENCLOSURE

(75) Inventors: Shao-Bo Han, Shenzhen (CN); Zhen Kang, Shenzhen (CN)

(73) Assignees: Hong Fu Jin Precision Industry (Shenzhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 49 days.

(21) Appl. No.: 11/267,471

(22) Filed: Nov. 4, 2005

(65) Prior Publication Data

US 2006/0092606 A1     May 4, 2006

(30) Foreign Application Priority Data

Nov. 4, 2004    (CN)   ................... 2004 2 0095019 U

(51) Int. Cl.
*G06F 1/16*        (2006.01)

(52) U.S. Cl. ........................ 361/686; 360/98.04; 711/4; 242/333

(58) Field of Classification Search ................ 242/333, 242/343.1; 340/542; 360/77.03, 75, 69, 360/98.04; 711/4; 361/679–687, 724–727
See application file for complete search history.

(56) References Cited

U.S. PATENT DOCUMENTS 6,798,664 B2    9/2004   Lin et al.

6,826,057 B1 *   11/2004   Gundogan et al. .......... 361/726
2002/0135477 A1 *   9/2002   Dabrowski et al. ......... 340/542

FOREIGN PATENT DOCUMENTS

CN     01279787.1     12/2001
CN     02230270.0     4/2002

* cited by examiner

*Primary Examiner*—Hung Van Duong
(74) *Attorney, Agent, or Firm*—Morris Manning & Martin LLP; Tim Tingkang Xia, Esq.

(57) ABSTRACT

An I/O interface cover assembly includes a panel, a bracket for accommodating an I/O interface element, a driving device, a locking device and a button. The panel defines an opening and a button hole adjacent the opening. The bracket is received in the opening, and includes one end pivotally connected to the panel and the other end defining an I/O slot and a locking hole therein. The driving device is disposed between the panel and the bracket for driving the bracket out from the opening of the panel. The locking device is movably arranged to the panel, and engagable with the locking hole of the bracket. The locking device is disposed with a resilient element. The button is disposed in the button hole of the panel, and is able to press the locking device to disengage from the locking hole of the bracket.

18 Claims, 6 Drawing Sheets

I/O INTERFACE COVER ASSEMBLY OF COMPUTER ENCLOSURE

CROSS-REFERENCE TO RELATED APPLICATION

Relevant subject matter is disclosed in the copending U.S. patent application Ser. No. 11/117,237, filed on Apr. 28, 2005, and entitled "COMPUTER FRONT BEZEL," which is assigned to the same assignee with this patent application.

BACKGROUND OF THE INVENTION

1. Field of the Invention

The present invention relates to an I/O interface cover assembly of a computer enclosure.

2. General Background

Usually, a computer maybe connect with some electronic devices, such as USB flash, earphone, and microphone. A plurality of input/output (I/O) holes, such as Universal Serial Bus (USB) holes corresponding to the USB flashes, is thus needed in the computer for plugging the electrical devices. In conventional computer, the I/O holes are defined in a rear plate of the computer. It is inconvenient for the user to plug the electrical devices into the I/O holes.

Another computer enclosure is disclosed in China Patent No. 01279787.1. The I/O holes are defined in a front panel of a computer enclosure. A cover is pivotably mounted to the front panel for covering the I/O holes. When the user sits in front of the computer enclosure, the aforementioned electrical devices are easy to be plugged into the I/O holes. However, the computer enclosure is often placed under a desk. It is also inconvenient to plug the electrical devices into the I/O holes.

Still another computer enclosure is disclosed in China Patent No. 02230270.0. The I/O holes are defined in a front panel of a computer enclosure. A cover is slidably mounted to the front panel for covering or exposing the I/O holes. A protruding handle is formed outwardly from the cover. However, the I/O holes are still arranged in the front panel. It is inconvenient to plug the electrical devices into the I/O holes. In addition, the protruding handle is easily to be hit accidentally by users.

What is needed is an I/O interface cover assembly of a computer enclosure, wherein the I/O interface cover assembly includes a plurality of movable I/O interfaces for convenient use.

SUMMARY

An I/O interface cover assembly in accordance with a preferred embodiment includes a panel, a bracket for accommodating an I/O interface element, a driving device, a locking device and a button. The panel defines an opening and a button hole adjacent the opening. The bracket is received in the opening, and includes one end pivotally connected to the panel and the other end defining an I/O slot and a locking hole therein. The driving device is disposed between the panel and the bracket for driving the bracket out from the opening of the panel. The locking device is movably arranged to the panel, and engagable with the locking hole of the bracket. The locking device is disposed with a resilient element. The button is disposed in the button hole of the panel, and is able to press the locking device to disengage from the locking hole of the bracket. The bracket together with the I/O interface element is capable of rotating in and out of opening of the panel, thereby facilitating users to access the I/O interface element.

Other advantages and novel features will become more apparent from the following detailed description when taken in conjunction with the accompanying drawings, in which:

DETAILED DESCRIPTION OF THE EMBODIMENT

Figure 1:
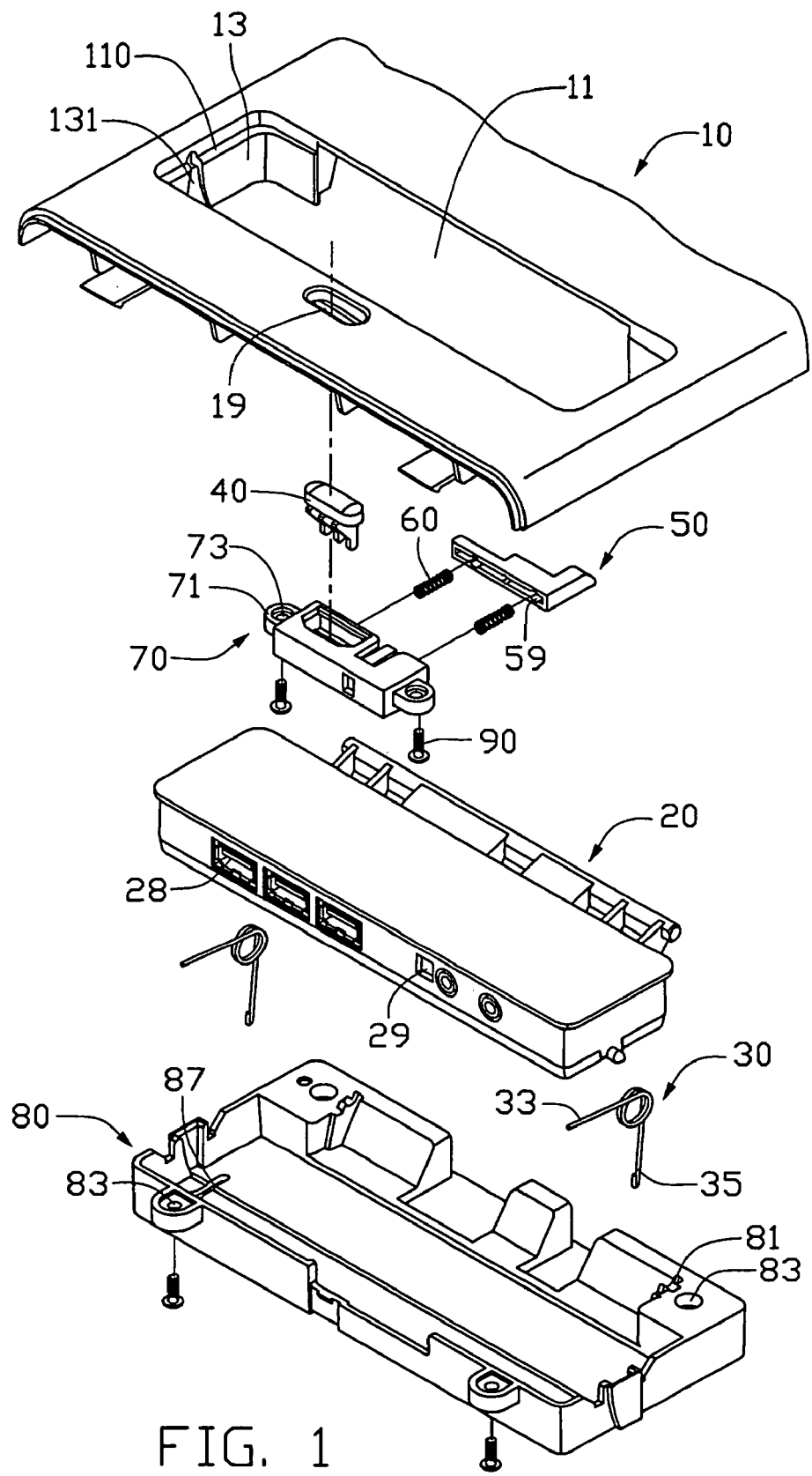
FIG. 1 is an exploded, isometric view of an I/O interface cover assembly in accordance with a preferred embodiment of the present invention, the I/O interface cover assembly comprising a panel, a bracket, a locking device, a fixing device and a holder.
Figure 2:
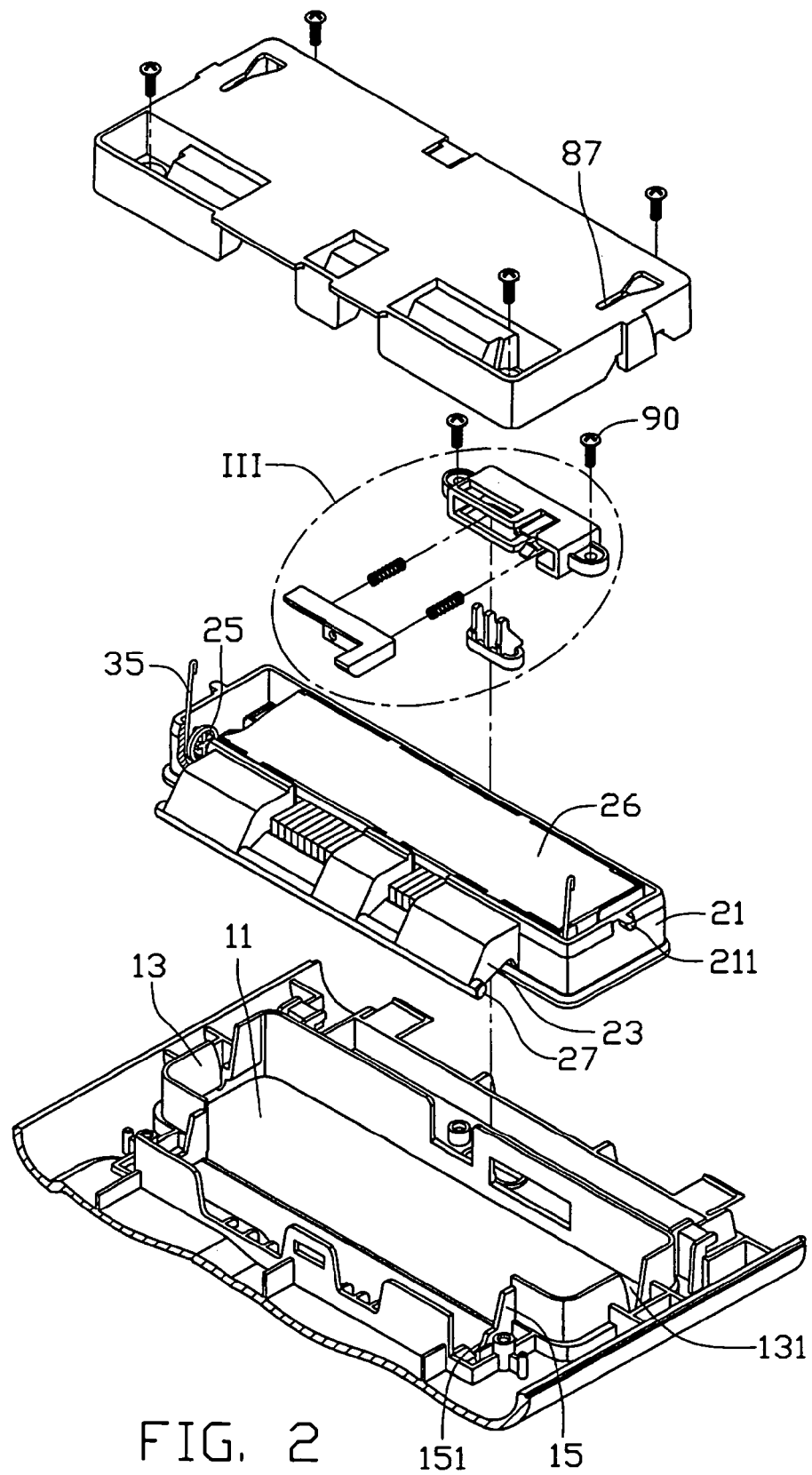
FIG. 2 is an exploded, isometric view of the I/O interface cover assembly of FIG. 1, but viewed from another aspect.
Figure 3:
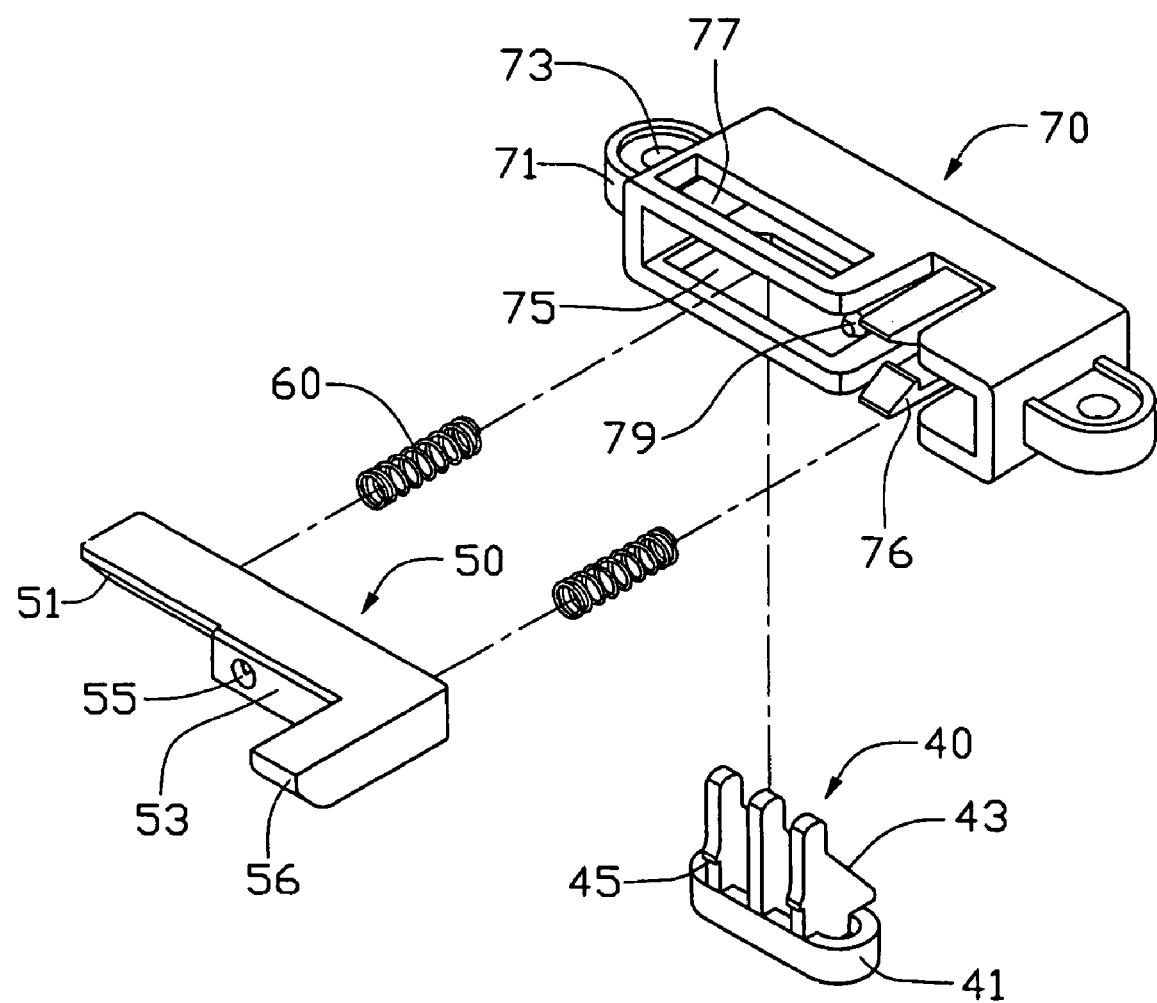
FIG. 3 is an enlarged view of an encircled portion III of FIG. 2.

Referring to FIGS. 1–3, an I/O cover assembly of an electronic device like a desktop computer in accordance with a preferred embodiment of the present invention includes a panel 10, a bracket 20, a driving device such as a pair of torsional springs 30, a button 40, a locking device 50, a fixing device 70, and a holder 80.

The panel 10 can be a computer front panel or a computer top panel. In this embodiment, the panel 10 is a computer top panel. A rectangular opening 11 is defined in a front portion of the panel 10. A step 110 is formed inwardly around the opening 11, and an inner wall 13 extends downwardly from the step 110. A pair of opposing horn-shaped guiding slots 131 is defined in the inner wall 13. An end of each guiding slot 131 is at the step 110. The inner wall 13 has one side exposed, and a pair of plates 15 extends rearwardly from where the inner wall 13 exposed. A receiving slot 151 is defined in each plate 15. An oval button hole 19 is defined in the panel 10 in the front of the opening 11.

The bracket 20 includes a rectangular hollow shell 21 and a connecting portion 23 extending rearwardly from a rear side of the shell 21. An I/O interface (such as a Universal Serial Bus) element 26 is accommodated in the shell 21. A pair of guiding posts 211 is formed outwardly from opposite sides of the shell 21 for respectively sliding in the guiding slots 131 of the inner wall 13 of the panel 10. Two cross-shaped protrusions 25 extend inwardly from opposite inner sides of the shell 21. A pair of pivot posts 27 is formed at the connecting portion 23 for pivotally engaging in the receiving slots 151 of the plates 15 of the panel 10. A plurality of slots 28 is defined in a front side of the shell 21 for exposing the I/O interface. A locking hole 29 is defined in the front side of the shell 21.

Each torsional spring 30 has a first end 33 and a second end 35. The button 40 has an oval cap 41 and a plurality of slanted pressing portions 43 extending from the cap 41. A salient 45 is formed from each of at least two of the pressing portions 43. The locking device 50 is generally L-shaped. A chamfer 51 is formed at the locking device 50 corresponding to the slanted pressing portions 43. A plane 53 is formed adjacent the chamfer 51. The plane 53 defines a through hole 55 therein. A latch 56 with a slanted end such as an arc-shaped end extends from the locking device 50. A pair of accommodating holes 59 is defined in the locking device 50. A pair of springs 60 is accommodated in the accommodating holes 59.

The fixing device 70 is hollow and has one side open for access of the locking device 50. A pair of ears 71 is formed from opposite sides of the fixing device 70. A mounting hole 73 is defined in each ear 71. Screws 90 extend through corresponding mounting holes 73 to secure the fixing device 70 to the panel 10. A large opening 75 and a small opening 77 are defined in upper and lower side walls of the fixing device 70, respectively. A pair of hooks 76 is formed adjacent the large and small openings 75, 77. A pole 79 is formed from an inner side of the fixing device 70.

The holder 80 is rectangular. A pair of receiving slots 81 is defined in opposite sides of the holder 80 corresponding to the receiving slots 151 of the panel 10. A plurality of mounting apertures 83 is defined in the holder 80. A plurality of screws extends through the mounting apertures 83 to secure the holder 80 to the panel 10. Two slits 87 are defined in the holder 80 corresponding to the torsional springs 30.

Figure 4:
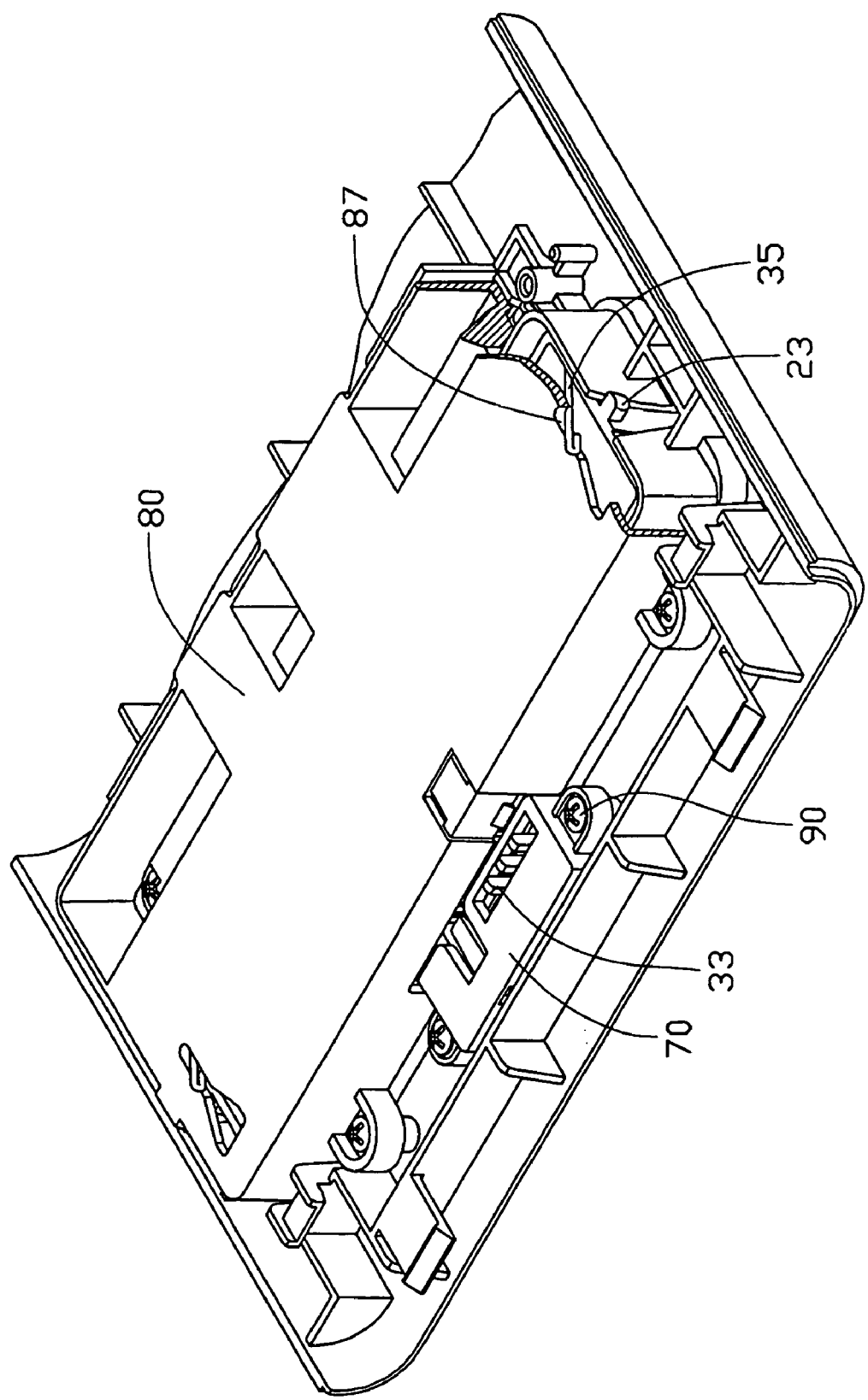
FIG. 4 is an assembled view of FIG. 2.

Referring also to FIG. 4, in assembly, each torsional spring 30 is placed around the corresponding cross-shaped protrusion 25, and the first end 33 of the torsional spring 30 abuts against an inner wall of the shell 21. The I/O interface element 26 is secured in the shell 21. Then the bracket 20 is placed in the opening 11 of the panel 10 with the pivot posts 27 being received in the receiving slots 151 of the panel 10. The holder 80 is then secured to the panel 10 via screws. The receiving slots 81 of the holder 80 together with the corresponding receiving slots 151 forms pivot spaces to hold the pivot posts 27 therein. The springs 60 are placed in the accommodating holes 59 of the locking device 50, and then the locking device 50 is placed in the fixing device 70. The pole 79 of the fixing device 70 extends into the through hole 55 of the locking device 50. The hooks 76 engages with the plane 53 of the locking device 50 to prevent the locking device 50 from springing out of the fixing device 70 by the force of the springs 60. The cap 41 of the button 40 is accommodated in the button hole 19 of the panel 10. The pressing portions 43 extend through the large opening 75 of the fixing device 70 to abut against the chamfer 51 of the locking device 50. The salients 45 engage with an edge of the large opening 75 via the force of the springs 60, so that the button 40 is prevented from escaping from the button hole 19.

Figure 5:
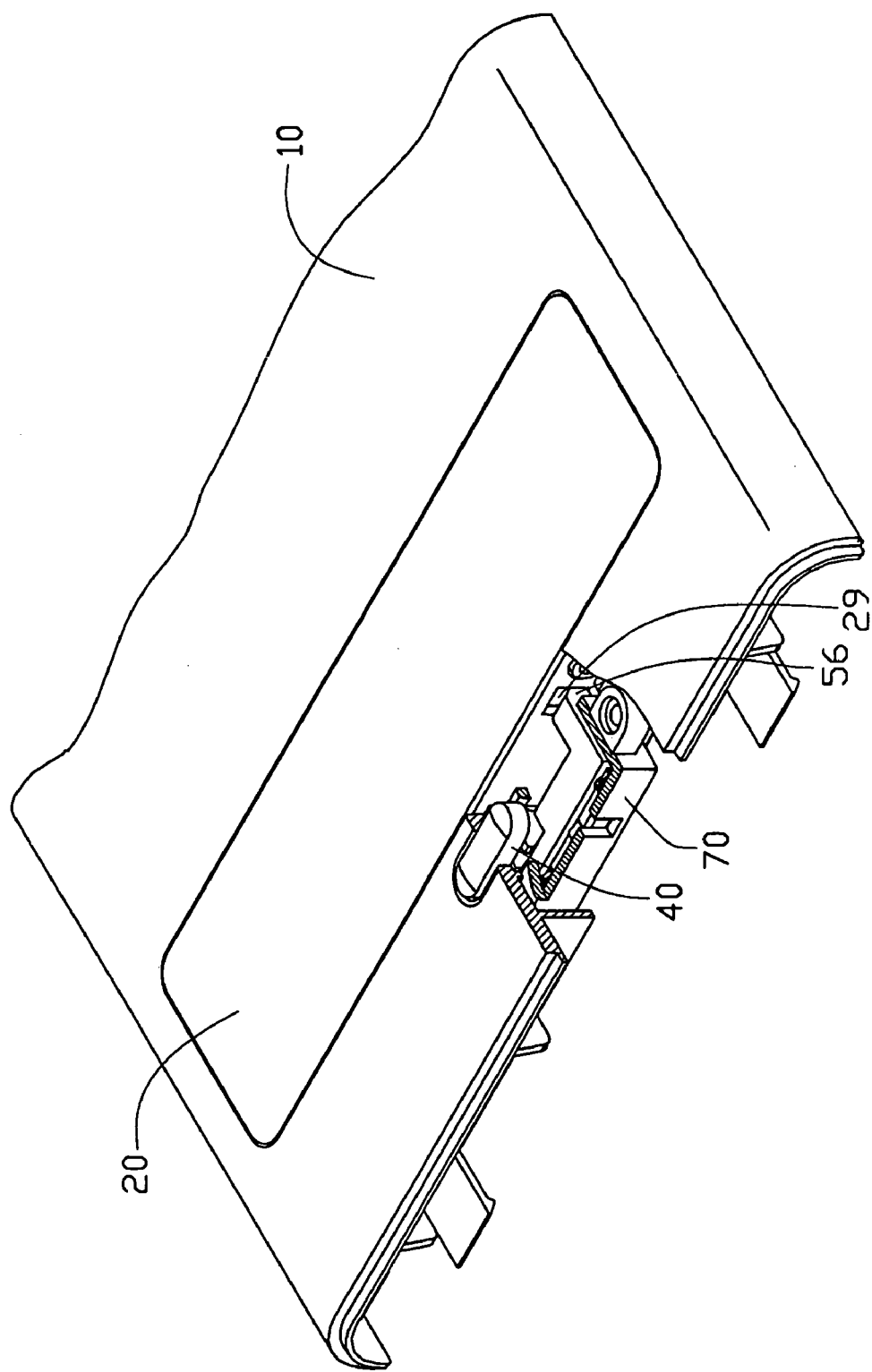
FIG. 5 is similar to FIG. 4, but being partly cut away for showing the bracket in a locked position.
Figure 6:
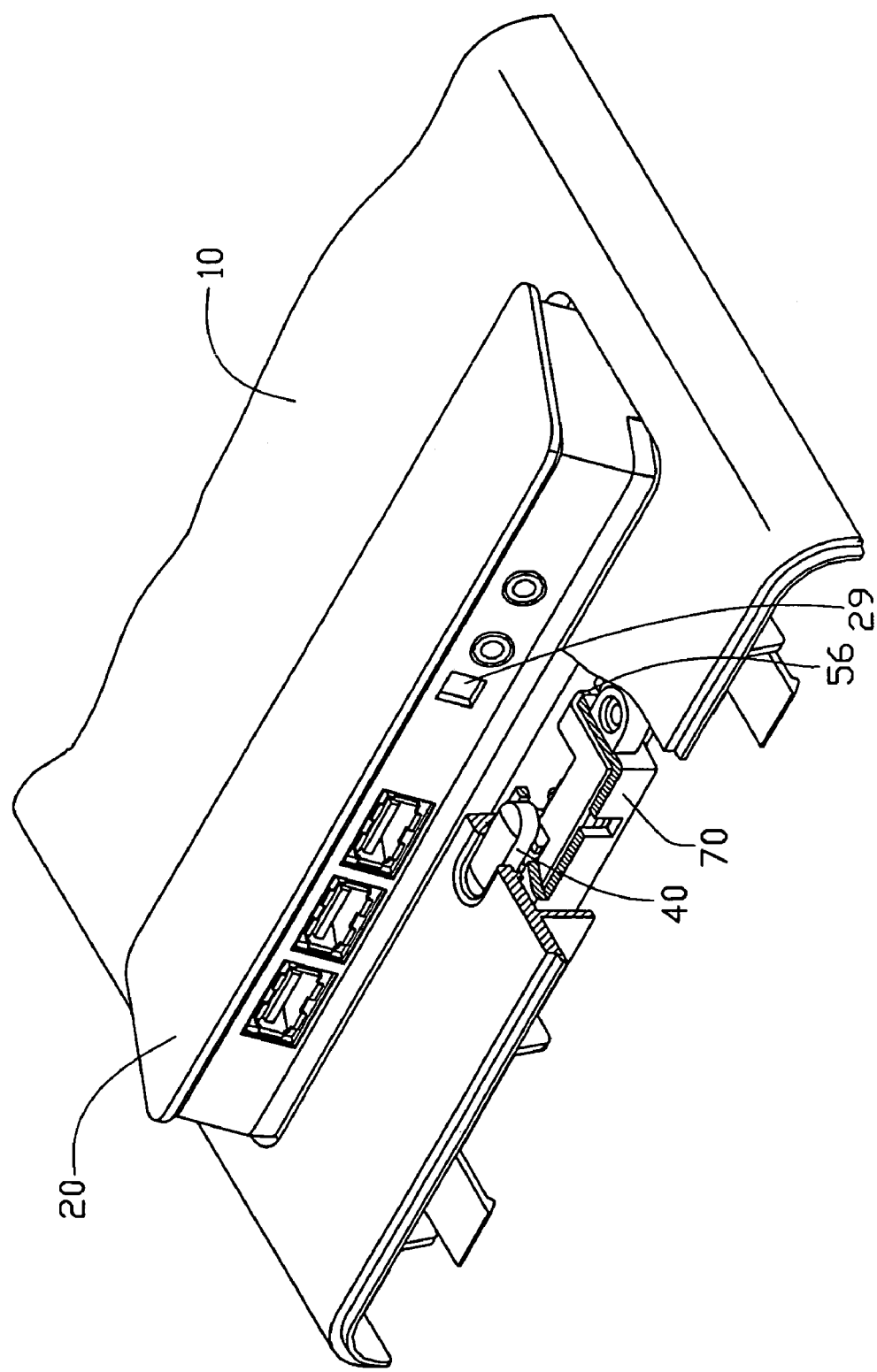
FIG. 6 is similar to FIG. 5, but showing the bracket in an open position.

Referring also to FIGS. 5 and 6, in closing the bracket 20, the bracket 20 is pressed downwardly, a lower edge of the bracket 20 forces the latch 56 of the locking device 50, so that the springs 60 are compressed. When the locking hole 29 is in alignment with the latch 56, the springs 60 rebound and force the latch 56 to engage in the locking hole 29 of the bracket 20. At this time, an upper surface of the bracket 20 is coplanar with the panel 10. The second end 35 of each torsional spring 30 is received in the corresponding slit 87 and abuts against an edge of the corresponding slit 87. The torsional springs 30 are in compressed status.

In opening the bracket 20, the button 40 is pressed, the slanted pressing portions 43 press the chamfer 51 of the locking device 50 and compress the springs 60, so that the latch 56 is withdrawn from the locking hole 29 of the shell 21. The bracket 20 is rotated outwardly via the force of the torsional springs 30. The guiding posts 211 slide along the guiding slots 131 until they reach the ends of the guiding slots 131 thereby preventing the bracket 30 rotating too far.

Thus, the I/O interface exposed through the slots 28 of the bracket 20 facilitates users to access thereto.

It is believed that the present embodiment and advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. An I/O interface cover assembly comprising:
    a panel defining an opening and a button hole adjacent the opening;
    a bracket for accommodating an I/O interface element, the bracket received in the opening of the panel, and comprising one end pivotally connected to the panel, and the other end defining an I/O slot and a locking hole therein;
    a driving device disposed between the panel and the bracket for driving the bracket out from the opening of the panel;
    a locking device movably arranged to the panel, and engagable with the locking hole of the bracket, the locking device being disposed with a resilient element; and
    a button disposed in the button hole of the panel and being able to press the locking device to disengage from the locking hole of the bracket.

2. The I/O interface cover assembly as claimed in claim 1, wherein the locking device forms a chamfer, the button comprises a slanted pressing portion to act on the chamfer, thereby a moving direction of the locking device is perpendicular to a moving direction of the button.

3. The I/O interface cover assembly as claimed in claim 1, wherein a fixing device is arranged to the panel and for the locking device movably accommodated therein, the resilient element is disposed between the fixing device and the locking device.

4. The I/O interface cover assembly as claimed in claim 1, wherein the driving device comprises a pair of torsional springs, each of the torsional springs is placed in the bracket and has one end abutting against the bracket and the other end abutting against the panel.

5. The I/O interface cover assembly as claimed in claim 1, wherein the panel comprises a holder arranged thereto, the driving device is disposed between the holder and the bracket.

6. The I/O interface cover assembly as claimed in claim 2, wherein a latch with a slanted end extends perpendicularly from the locking device for engaging in the locking hole of the bracket.

7. The I/O interface cover assembly as claimed in claim 3, wherein the fixing device defines an opening for extension of the button therethrough, and a pair of hooks for holding the locking device.

8. The I/O interface cover assembly as claimed in claim 5, wherein the panel defines a pair of receiving slots, the holder defines a pair of receiving slots respectively cooperating with the receiving slots of the panel to define a pair of pivot spaces for pivoting of said one end of the bracket therein.

9. An I/O interface cover assembly comprising:
    a panel defining an opening;
    a bracket for accommodating an I/O interface element therein, the bracket connected to the panel and being capable of rotating in and out of the opening;
    a locking device movably arranged to the panel; and a button arranged in the panel for pressing the locking device; wherein when the button is moved in a first direction, the locking device is driven by the button to move in a second direction perpendicular to the first direction between engaging with the bracket and disengaging from the bracket.

10. The I/O interface cover assembly as claimed in claim 9, wherein the button has a pressing portion with a slanted surface, the locking device has a chamfer corresponding to the slanted surface of the pressing portion.

11. The I/O interface cover assembly as claimed in claim 9, wherein a holder is arranged under the panel to accommodate the bracket, a driving device is disposed between the holder and the bracket for driving the bracket out of the opening when the locking device disengages from the bracket.

12. The I/O interface cover assembly as claimed in claim 10, wherein the locking device forms a latch extending toward the bracket, the bracket defines a locking hole corresponding to the latch.

13. The I/O interface cover assembly as claimed in claim 12, wherein a fixing device is arranged to the panel, the locking device is movably accommodated in the fixing device, a resilient element is disposed between the locking device and the fixing device.

14. The I/O interface cover assembly as claimed in claim 11, wherein the driving device comprises a pair of torsional springs, each of the torsional springs is disposed to the bracket, and has one end abutting against the bracket, and the other end abutting against the holder.

15. The I/O interface cover assembly as claimed in claim 13, wherein the fixing device defines an opening for extension of the pressing portion of the button to access to the chamfer of the locking device, a salient is formed from the pressing portion to engage with an edge of the opening of the fixing device.

16. An electronic device comprising:

a panel of said electronic device covering at least one side of said electronic device, said panel defining an opening along said at least one side so as to communicate an interior of said electronic device and an outside of said electronic device;

a bracket movably disposed next to said opening of said panel in said interior of said electronic device, said bracket defining at least one input/output (I/O) interface thereon exposable to said outside of said electronic device when said bracket moves from said interior to said outside through said opening, and said bracket configured to have a trend thereof to move from said interior to said outside through said opening; and a locking device attachable to one of said panel and said bracket, and operable from said outside of said electronic device, said locking device capable of interacting with said bracket so as to restrict said bracket from moving to said outside through said opening in a first operation status thereof, and to allow said bracket freely performing said trend to move to said outside through said opening in a second operation status thereof.

17. The electronic device as claimed in claim 16, wherein a pair of torsional springs is installed in said electronic device against said bracket so as to contribute to said moving trend of said bracket.

18. The electronic device as claimed in claim 16, wherein said locking device is movably installed in a fixing device which is fixedly attachable to said one of said panel and said bracket beside said opening.

* * * * *